United States Patent

[11] 3,576,504

| [72] | Inventor | John V. Lopatauskas |
| | | Santa Monica, Calif. |
| [21] | Appl. No. | 780,618 |
| [22] | Filed | Dec. 3, 1968 |
| [45] | Patented | Apr. 27, 1971 |
| [73] | Assignee | TRW Semiconductors, Inc. |
| | | Los Angeles, Calif. |

[54] TRANSFORMERLESS DC TO AC POWER SUPPLY
4 Claims, 4 Drawing Figs.

[52] U.S. Cl............................................... 331/116,
310/8.1, 331/113, 331/159
[51] Int. Cl............................................... H03b 5/36
[50] Field of Search............................................... 331/113,
116, 144, 145, 158, 159, 166; 310/8.1

[56] References Cited
UNITED STATES PATENTS

| 2,396,224 | 3/1946 | Artzt | 331/144 |
| 2,553,165 | 5/1951 | Bliss | 331/144 |
| 2,752,512 | 6/1956 | Sarratt | 310/8.1 |
| 2,782,309 | 2/1957 | Aasma | 331/144 |
| 3,010,073 | 11/1961 | Melas | 331/113 |
| 3,447,051 | 5/1969 | Attwood et al. | 310/8.1 |

*Primary Examiner*—John Kominski
*Attorney*—Spensley, Horn & Lubitz

ABSTRACT: A transformerless DC to AC power supply which comprises a piezoelectric crystal dimensioned to be resonant at a given frequency, excited to resonance by the application of a sinusoidal signal derived from a multivibrator powered by a direct-current power source. A feedback loop adapts the output of the piezoelectric crystal to synchronize the operating frequency of the multivibrator at the resonant frequency of the piezoelectric crystal.

PATENTED APR 27 1971 3,576,504
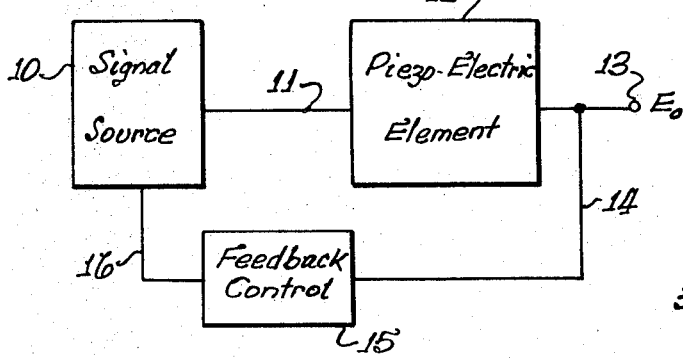
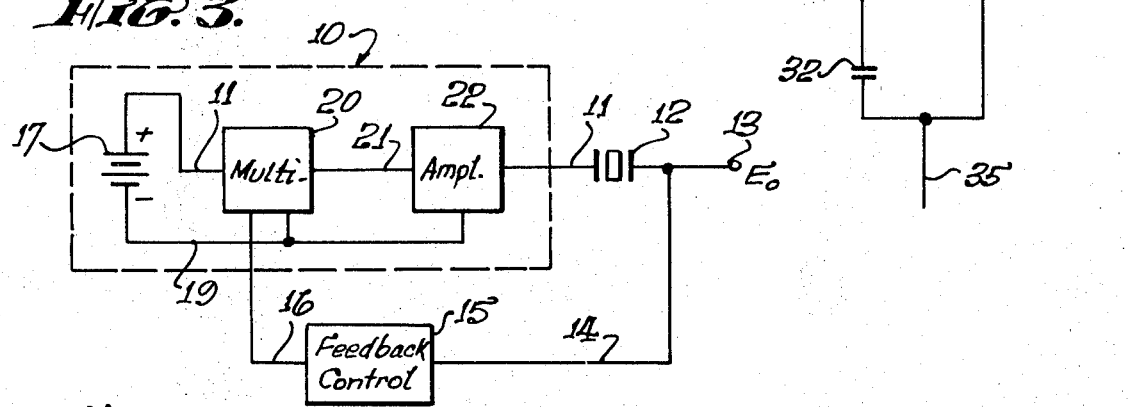
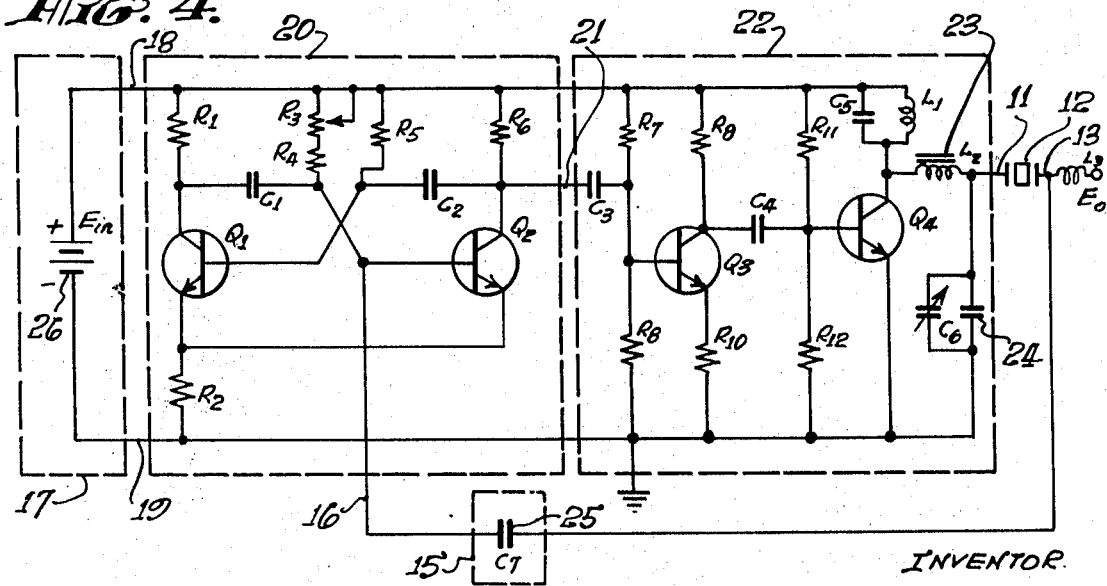
INVENTOR.
JOHN V. LOPATAUSKAS,
By His Attorneys
Spensley & Horn

3,576,504

TRANSFORMERLESS DC TO AC POWER SUPPLY

BACKGROUND OF THE INVENTION

The invention relates generally to power supplies and, more specifically, to an improved circuit which generates high voltage AC signals from a DC power source. In many fields of technology there is a need for DC to AC power sources where weight and physical size are limiting factors. On approach to solving this problem is the use of a step-up transformer. Through the use of a transformer, a low voltage AC signal can be converted to a high voltage AC signal. Although this is an adequate solution in theory, the accompanying practical problems are excessive. Transformers tend to be heavy and space consuming. When a small transformer core with an increased number of windings is used, a reliability problem is created. Since a great many windings are required, the diameter of the wire must be reduced thereby reducing the ability of the device to absorb mechanical shock. Another problem inherent to the prior art is the need for an external AC power source. This adds to the collateral problems of space, weight, and power consumption.

It is the purpose of this invention to provide an electrical circuit which can generate a high voltage AC signal of constant frequency from a DC power source without the use of a transformer.

A problem which has not been solved by the prior art is the stability of operation of a converter employing a piezoelectric component. In U.S. Pat. No. 2,975,354, column 3, line 5, it is stated: "in obtaining a high output voltage, it is necessary that the alternating voltage source, provide a voltage having approximately the same frequency as the resonant frequency of the transformer." The prior art discloses no way to insure operation of the piezoelectric component at resonance. The applicant's invention solves this problem by synchronizing the signal used to excite the piezoelectric component to resonance through the adaptation of the piezoelectric member's partial output signal.

SUMMARY OF THE INVENTION

The basic problem sought to be solved by the invention is the generation of a high voltage AC signal from a DC power source where the AC signal is at a constant frequency.

It is, therefore, an object of the present invention to provide a DC to AC inverter using a piezoelectric crystal.

It is also an object of the present invention to provide an improved system for synchronizing the performance of a transformerless DC to AC power supply through the use of the supply output itself.

The invention utilizes a piezoelectric crystal which is dimensioned to be resonant at a given frequency. By chopping the DC power supply voltage at a rate which is equal to the resonant frequency of the piezoelectric crystal, and amplifying the resulting signal, the resulting signal can be used as an input signal to the piezoelectric crystal. The input signal to the piezoelectric crystal is adapted to excite the piezoelectric crystal to resonance thereby causing the crystal to produce an AC signal many times the amplitude of the input signal and at the resonant frequency of the crystal. Part of the output signal of the piezoelectric crystal is applied to a feedback circuit, and the output of the feedback circuit is used to control the chopping rate of the DC power supply voltage. The result is an electrical circuit which will produce a high voltage AC signal from a DC voltage source, the AC signal being maintained at a precise frequency. The novelty of the invention is the use of a low voltage DC power supply to serve as a source for a resulting AC signal, and the use of the piezoelectric crystal itself to regulate the chopping rate of the DC voltage signal.

DESCRIPTION OF THE DRAWINGS

The novel features which are believed to be characteristic of the invention, both as to its organization and method of operation, together with further objects and advantages thereof will be better understood from the following description, considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the Drawing:

FIG. 1 is a schematic diagram in block form of a first preferred embodiment of the invention suitable for the production of high voltage AC potentials;

FIG. 2 is a schematic diagram of the equivalent circuit of the piezoelectric crystal shown in FIG. 1;

FIG. 3 is a schematic diagram, in partial block form, illustrating an application of the present invention suitable for producing high voltage AC potentials from a DC power source without the use of a transformer; and FIG. 4 is a schematic diagram of a preferred embodiment of the invention showing typical circuitry for the production of the high voltage AC signals.

DESCRIPTION OF THE PRESENTLY PREFERRED EMBODIMENTS

A first embodiment of the applicant's invention is shown in FIG. 1. The high voltage supply there shown comprises a signal source 10, a piezoelectric crystal member 12, and a feedback control 15 to synchronize the frequency of the signal source 10.

The piezoelectric member 12 is typically a quartz crystal, but it could be a representative composition of polycrystalline aggregates of a ferroelectric ceramic, one of which is barium titanate. If a piezoelectric crystal has electrodes plated on opposite faces, and if a potential is applied across the electrodes, forces will be exerted on the bound charges within the crystal. As an elastic body, the crystal has a natural frequency of contraction and expansion in the direction of the field, and if the field is made to alternate at the natural frequency, the crystal responds with vigorous resonant vibrations. The resonant frequency and the mechanical $Q$ depend on the crystal dimensions, how the surfaces are oriented with respect to its axes, and how the crystal is mounted.

The electrical equivalent circuit of the piezoelectric crystal 12 is shown in FIG. 2. The inductor 30, capacitor 31, and resistor 32 are the analogs of the mass, compliance, and damping factor of the mechanical system. The capacitor 33 represents the electrostatic capacitance between electrodes 34 and 35 with the crystal as the dielectric. The magnitude of capacitor 33 is much larger than that of capacitor 32, the actual values depending on the selected crystal. In order for the loop gain to be greater than unity, initially, the frequency of the crystal's input signal must be near the parallel resonant frequency of the crystal. The parallel resonant frequency will be determined by the characteristics of the selected crystal.

The signal source 10 produces a sinusoidal signal which is adapted to excite the piezoelectric member 12 to resonance. The output of the signal source 10 is coupled to the piezoelectric member 12 via lead 11. In order to maintain the resonant state of the piezoelectric member 12, the output of the signal source 10 must be at approximately the parallel resonant frequency of the piezoelectric member 12.

In order to maintain resonance, the frequency of the signal source 10 output must be controlled. This is done by coupling some fraction of the piezoelectric member's output signal 13 to a feedback control circuit 15 via lead 14. The feedback control circuit 15 must provide the proper phase reversal required to synchronize the signal source 10 frequency at the piezoelectric member 12 resonant frequency and provide an adequate feedback signal level, to maintain closed loop condition, on line 16 (which connects the feedback control 15 to the signal source 10) and, therefore, keep the frequency of the signal source 10 at the resonant frequency of the piezoelectric crystal 12.

A presently preferred embodiment of the signal source of FIG. 1 is shown in FIG. 3. The signal source comprises a direct-current power source 17, a multivibrator circuit 20, and an amplifier 22; amplifier 22 may comprise one or more conventional AC stages. The DC power source 17 is coupled to the multivibrator circuit 20 via line 18. The polarity of the DC power source 17 is consistent with the active elements of the multivibrator circuit 20 and the amplifier 22. The output of the multivibrator circuit 20 appears on line 21, and is an electrical square wave with a peak-to-peak voltage approximately equal to the value of the DC power source 17. The amplifier 22 will filter the square wave appearing on line 21, and increase the amplitude to a level consistent with the desired output of the piezoelectric crystal 12.

Since the piezoelectric crystal 12 functions as a step-up transformer only when operated in the region of resonance, the feedback control circuit 15 must synchronize the frequency of the multivibrator 20 at the resonant frequency of the piezoelectric member 12. The multivibrator circuit 20 can take several forms, but typically there are two active elements which alternate between nonconducting and conducting states and, therefore, produce signals which are 180° out of phase. The multivibrator must be designed to operate at a frequency that is within 5 per cent of the resonant frequency of the piezoelectric member 12. The output of the feedback control circuit 15 is coupled to the multivibrator via line 16 and connected to the section of the multivibrator which is approximately in phase with the output of the feedback control circuit 15. The output of the feedback control circuit 15 will determine when the multivibrator 20 changes states and thereby synchronize the frequency of the multivibrator 20 at the resonant frequency of the piezoelectric member 12. Synchronization of the multivibrator 20 counteracts the difference between the resonant frequency of the piezoelectric member 12 and the design tolerances of the multivibrator 20.

FIG. 4 shows the circuit details of an embodiment of a transformerless DC to AC power supply. Like elements appearing in FIGS. 1 and 3 are numbered the same for ease in identification. The DC power supply 17 is coupled to the circuit via line 18 as a positive DC voltage 26 because the active elements are NPN transistors. The multivibrator circuit 20 is in the form of an astable multivibrator. The astable multivibrator 20 operates at a frequency which is approximately the resonant frequency of the piezoelectric member 12. The output of the astable multivibrator 20 is coupled to the amplifier stages 22 via line 21. The output signal is a square wave with a peak-to-peak voltage approximately equal to the value of the DC power source 17.

The amplifier 22 comprises two stages of amplification which are made up of transistors and a resonant network including inductor 23 and capacitor 24. The square wave input to the amplifier 22 is converted to a sine wave oscillating at the resonant frequency of the piezoelectric member 12. The second stage of the amplifier is coupled to the resonant network via line 27. The resonant network comprises inductor 23 and capacitor 24. The inductor 23 and capacitor 24 comprise a standard series resonant circuit, the values selected to be resonant at the resonant frequency of the piezoelectric member 12, an exemplary resonant frequency being 100kc. At resonance, the voltage across the inductor 23 will be many times the voltage drop across the entire resonant network, therefore, this voltage is the input to the piezoelectric member 12 and is coupled to the piezoelectric member 12 via line 11. The input to the piezoelectric member 12 will be a sine wave oscillating at the resonant frequency of the piezoelectric member 12, with an amplitude consistent with the desired piezoelectric members's output 13.

In order to maintain resonance, the feedback control circuit 15 is used to synchronize the frequency of oscillation of the astable multivibrator 20. Capacitor 25 is used to transfer a portion of the piezoelectric member's output 13 to the astable multivibrator 20. The value of capacitor 25 is selected to feedback that voltage which is within the power limitations imposed by the selection of the transistors. Capacitor 25 causes a phase lag, therefore, the output of the feedback control 15 is coupled to the leg of the astable multivibrator 20, via line 16, which carries a signal which is approximately in phase with the feedback signal. The feedback signal will synchronize the frequency of the astable multivibrator 20 by forcing the transistor into conducting and nonconducting states.

For purposes of example only representative values are shown in the following table:

| Component: | Representative values |
| --- | --- |
| $E_{in}$ | DC 3 v. |
| $R_1$, $R_6$ | 2.7K |
| $R_2$ | ohms 220 |
| $R_3$ | 5K |
| $R_4$, $R_5$ | 43K |
| $C_1$, $C_2$ | 150 pf |
| $C_3$, $C_4$ | 1,000 pf |
| $R_7$ | 18K |
| $R_8$ | 10K |
| $R_9$ | 1K |
| $R_{10}$ | ohms 10 |
| $R_{11}$ | 10K |
| $R_{12}$ | 4.7K |
| $C_5$ | .47 μf |
| $L_1$ | 50 μh |
| $L_2$ | 1,500 μh |
| $C_6$ | 1,500 pf |
| $C_7$ | 2 pf |
| $Q_1$, $Q_2$ | 2N 2222 |
| $Q_3$, $Q_4$ | 2N 2222 |

The selected quartz piezoelectric member 12 has a resonant frequency of 100kc. The astable multivibrator 20 operates at approximately 100kc., the output of which appears on line 21. The signal in line 21 is a square wave with a peak-to-peak voltage of 2.6 volts. The output of the second amplifier stage appear on line 27 and is a 100kc. sine wave with a peak-to-peak voltage of 6 volts. The input to the piezoelectric member appears on line 11 and is a 100kc. sine wave with a peak-to-peak voltage of 60 volts. The output of the transformerless DC to AC power supply appears on line 13 and is a 100kc. sine wave with a peak-to-peak voltage of 1,000 volts.

I claim:

1. A DC to AC power supply comprising:
   a. a piezoelectric crystal having input and output terminals and dimensioned to be resonant at a given parallel resonant frequency and adapted to output an alternating electrical signal at the parallel resonant frequency;
   b. direct current power means for providing direct current voltage;
   c. a multivibrator connected to said direct current power means, said multivibrator outputting a signal alternating substantially at the parallel resonant frequency of said piezoelectric crystal and including first and second cooperating members each having an electrical signal in a predetermined phase relationship with the output signal of said piezoelectric crystal;
   d. means for connecting the output of said multivibrator to the input of said piezoelectric crystal; and
   e. feedback means for connecting a portion of the output signal of said piezoelectric crystal to the member of said multivibrator substantially in phase with the output of said piezoelectric crystal whereby the output signal of said multivibrator is substantially synchronized with the output signal of said piezoelectric crystal.

2. A DC to AC power supply as in claim 1 wherein said multivibrator is an astable multivibrator.

3. A DC TO AC power supply as in claim 2 wherein said means for connecting said astable multivibrator to said piezoelectric crystal comprises a two-stage amplifier having an output therefrom which is a sinusoidal signal, the output of said amplifier being connected to a series-resonant device adapted to output a sinusoidal signal at substantially the parallel resonant frequency of said piezoelectric crystal.

4. A high voltage AC to DC power supply comprising:
   a. a piezoelectric crystal dimensioned to be resonant at a given parallel resonant frequency and adapted to output an alternating electrical signal upon receipt of an excitation signal at substantially the parallel resonant frequency of said piezoelectric crystal;
   b. a direct current voltage source;
   c. an astable multivibrator adapted to output a square wave signal and having first and second semiconductor active members each having a base, emitter and collector electrodes, said first and second active members having a predetermined phase relationship with respect to each other and with respect to the output of said piezoelectric crystal;
   d. an amplifier having a sinusoidal output signal connected to the output of said astable multivibrator, said amplifier including a series-resonant member having an inductor and a capacitor connected to each other, the output of said amplifier being at the junction of said inductor and said capacitor, said output connected to said piezoelectric crystal providing the excitation signal thereto;
   e. feedback means for coupling a predetermined portion of the output signal of said piezoelectric crystal to the base of the active member of said astable multivibrator which is substantially in phase with the output signal of said piezoelectric crystal; and
   f. means for connecting said astable multivibrator and said amplifier to said DC voltage source.